US012449830B2

(12) United States Patent
Craescu

(10) Patent No.: US 12,449,830 B2
(45) Date of Patent: Oct. 21, 2025

(54) HIGH VOLTAGE INPUT LOW DROPOUT REGULATOR CIRCUIT

(71) Applicant: Microchip Technology Incorporated, Chandler, AZ (US)

(72) Inventor: Alexandru-Valentin Craescu, Buchare (RO)

(73) Assignee: Microchip Technology Incorporated, Chandler, AZ (US)

(*) Notice: Subject to any disclaimer, the term of this patent is extended or adjusted under 35 U.S.C. 154(b) by 219 days.

(21) Appl. No.: 17/970,033

(22) Filed: Oct. 20, 2022

(65) Prior Publication Data

US 2023/0305585 A1 Sep. 28, 2023

Related U.S. Application Data

(60) Provisional application No. 63/322,869, filed on Mar. 23, 2022.

(51) Int. Cl.
*G05F 1/563* (2006.01)
*G05F 1/56* (2006.01)
*G05F 1/575* (2006.01)

(52) U.S. Cl.
CPC .............. *G05F 1/563* (2013.01); *G05F 1/561* (2013.01); *G05F 1/575* (2013.01)

(58) Field of Classification Search
CPC ............. G05F 1/563; G05F 1/56; G05F 1/575
See application file for complete search history.

(56) References Cited

U.S. PATENT DOCUMENTS

| | | | | |
|---|---|---|---|---|
| 6,600,299 | B2 * | 7/2003 | Xi | G05F 1/575 323/280 |
| 10,146,240 | B1 * | 12/2018 | Wang | G05F 3/242 |
| 10,845,831 | B2 | 11/2020 | Liu et al. | |
| 2013/0063109 | A1 | 3/2013 | Egan et al. | |
| 2019/0317536 | A1 * | 10/2019 | Liu | G05F 1/467 |
| 2023/0064967 | A1 * | 3/2023 | Kasina | G05F 1/461 |

OTHER PUBLICATIONS

Search Report and Written Opinion of the International Searching Authority, European Patent Office, Mar. 1, 2023, International Application No. PCT/US2022/050679.
Micrel Inc, entitled MIC5159 Programmable Current Limit Cap LDO Regulator Controller, pp. 1-23, Jun. 1, 2006.
Jackum et al., entitled "Capacitor-less LVR for a 32-bit Automotive Microcontroller SoC in 65nm CMOS", Sep. 17, 2012, pp. 329-332, Abstract, Fig. 1.

* cited by examiner

*Primary Examiner* — Alex Torres-Rivera
(74) *Attorney, Agent, or Firm* — Shumaker, Loop & Kendrick, LLP; Ryan M. Corbett

(57) ABSTRACT

A low dropout (LDO) regulator circuit is provided. The LDO regulator circuit may include a pre-regulator circuit to receive a high voltage input voltage and provide a low voltage supply voltage, and an LDO regulator to receive the low voltage supply voltage and provide a low voltage output voltage. The pre-regulator circuit may include an input stage, an output stage coupled to the input stage, and a first MOSFET coupled to the output stage to provide the low voltage supply voltage. The input stage and first MOSFET may receive the high voltage input voltage. The LDO regulator may include a second MOSFET coupled to the first MOSFET, and may receive the low voltage supply voltage and provide the low voltage output voltage.

10 Claims, 7 Drawing Sheets

HIGH VOLTAGE INPUT LOW DROPOUT REGULATOR CIRCUIT

CROSS-REFERENCE TO RELATED APPLICATION

This application claims the benefit of U.S. Provisional Patent Application No. 63/322,869, filed on Mar. 23, 2022, which is incorporated herein by reference in its entirety.

TECHNICAL FIELD

The present disclosure relates generally to low dropout (LDO) regulators, and more specifically high voltage input LDO regulators with fast transient response.

BACKGROUND

FIG. 1 shows a circuit diagram of an LDO regulator 100 according to the prior art. Referring to FIG. 1, the LDO regulator 100 includes an input stage 105 (which may be, for example, a metal oxide semiconductor (MOS) differential pair that is an input stage of an operational amplifier or a comparator) that receives a low voltage rail of approximately 2.9V to 3.5V, as a supply voltage. The input stage 105 may have a non-inverting input arranged to receive a reference voltage. For example, the reference voltage may be a band gap voltage (VBG) provided by a band gap circuit (not shown), and may be approximately 1V. The input stage 105 may also include an inverting input arranged to receive a low voltage output voltage that may be approximately 3.3V, or a portion of the low voltage output voltage, as shown in FIG. 1 and described in more detail below.

The output of the input stage 105 may be coupled to an output stage 110, which may also receive the low voltage rail of approximately 2.9V to 3.5V, as a supply voltage. Input stage 105 and output stage 110 may be mixed in a single stage, e.g., a folded cascode. The output stage 110 may be coupled to a level shifter (LS) 115, which receives a high voltage rail of approximately 6V to 25V, as a supply voltage. As used herein, "high voltage" means a voltage greater than approximately 5.5V to 6V, and "low voltage" means a voltage less than approximately 5.5V, though the value may change depending on the application. The LDO regulator 100 of FIG. 1 may also include a high voltage PMOS field effect transistor (FET) 120, having a gate terminal coupled to the output of the level shifter 115, and a source terminal coupled to the high voltage rail. The high voltage PMOS FET 120 may also include a drain terminal that provides a low voltage output voltage of approximately 3.3V. The LDO regulator 100 of FIG. 1 may also include a voltage divider having two resistors 125 and 130 to divide the low voltage output voltage. The divided low voltage output voltage is coupled to the inverting input of the input stage.

FIG. 2 shows a circuit diagram of an LDO regulator 200 according to the prior art. The LDO regulator 200 of FIG. 2 is similar to the LDO regulator 100 of FIG. 1, except that the high voltage rail is provided to the input stage, the output stage, and the source terminal of the high voltage PMOS FET, and the level shifter 115 is omitted.

In the LDO regulators 100, 200 according to FIGS. 1 and 2, the usage of devices having a low voltage (e.g., less than 5.5V) gate-source voltage (Vgs) and the high voltage rail create high impedance nodes, which introduce low frequency poles, reduces bandwidth and speed, an impacts the transient response, which can be improved by using an external decoupling capacitor. Therefore, there is a need for an LDO regulator that receives a high voltage input, but can provide a faster transient response than the LDO regulators 100, 200 without requiring an external decoupling capacitor.

SUMMARY

According to an aspect of one or more examples, there is provided an LDO regulator circuit that may include a pre-regulator circuit arranged to receive a high voltage input voltage and provide a low voltage supply voltage, and an LDO regulator (e.g., having a faster transient response than the prior art LDO regulators 100, 200 of FIGS. 1 and 2, used with or without an output capacitor) to receive the low voltage supply voltage and provide a low voltage output voltage. The pre-regulator circuit may include an input stage, an output stage coupled to the input stage, and a first MOSFET coupled to the output stage to provide the low voltage supply voltage. The input stage, output stage, and first MOSFET may receive the high voltage input voltage. The high speed LDO regulator may include a second MOSFET coupled to the first MOSFET to provide the low voltage output voltage.

The first MOSFET may be an n-type MOSFET and the second MOSFET may be a p-type MOSFET. The source terminal of the first MOSFET may be coupled to a source terminal of the second MOSFET, the low voltage supply voltage may be provided at the source terminal of the first MOSFET, and the low voltage output voltage may be provided at a drain terminal of the second MOSFET.

The high speed LDO regulator may include a first amplifier and a second amplifier, to respectively receive the low voltage supply voltage. The first amplifier may include an inverting input to receive the low voltage output voltage and a non-inverting input to receive a reference voltage. The second amplifier may include a non-inverting input to receive an output of the first amplifier, and an inverting input coupled to the low voltage output voltage of the high speed LDO regulator. The output of the second amplifier may be coupled to a gate terminal of the second MOSFET.

The high speed LDO regulator may include a voltage divider to divide the low voltage output voltage. The inverting input of the first amplifier may receive a divided low voltage output voltage from the voltage divider.

According to another aspect of one or more examples, there is provided an LDO regulator circuit that may include a pre-regulator circuit to receive a first high voltage input voltage and a second high input voltage, and provide a low voltage supply voltage, and a high speed LDO regulator to receive the low voltage supply voltage and provide a low voltage output voltage. The pre-regulator circuit may include an input stage, an output stage coupled to the input stage, and a first MOSFET coupled to the output stage to provide the low voltage supply voltage. The input stage and the first MOSFET may receive the first high voltage input voltage, and the output stage may receive the second high voltage input voltage. The high speed LDO regulator may include a second MOSFET coupled to the first MOSFET to provide the low voltage output voltage.

According to another aspect of one or more examples, there is provided a method of regulating a low voltage output voltage. The method may include receiving a first high voltage input voltage at a drain terminal of a first MOSFET, providing a low voltage supply voltage at a source terminal of the first MOSFET, which is coupled to a source terminal of a second MOSFET, and providing a low voltage output voltage at a drain terminal of the second MOSFET. The first MOSFET may be a high voltage n-type MOSFET and the second MOSFET may be a low voltage p-type MOSFET. The method may also include providing a divided low voltage output voltage to an inverting input of a first amplifier, wherein the divided low voltage is provided from a voltage divider coupled to the drain terminal of the second MOSFET, and a reference voltage to a non-inverting input of the first amplifier. The method may include providing an output of the first amplifier to a non-inverting input of a second amplifier, and the low voltage output voltage to an inverting input of the second amplifier, and controlling a gate voltage of the second MOSFET based on an output of the second amplifier. The method may also include, in response to an increase in a load coupled to the low voltage output voltage, controlling the gate voltage of the second MOSFET to generate an increased load current at the drain terminal of the second MOSFET. The method may also include providing a second high voltage input voltage to a gate terminal of the first MOSFET, wherein the second high voltage input voltage may be greater than the first high voltage input voltage.

DETAILED DESCRIPTION OF VARIOUS EXAMPLES

Figure 1:
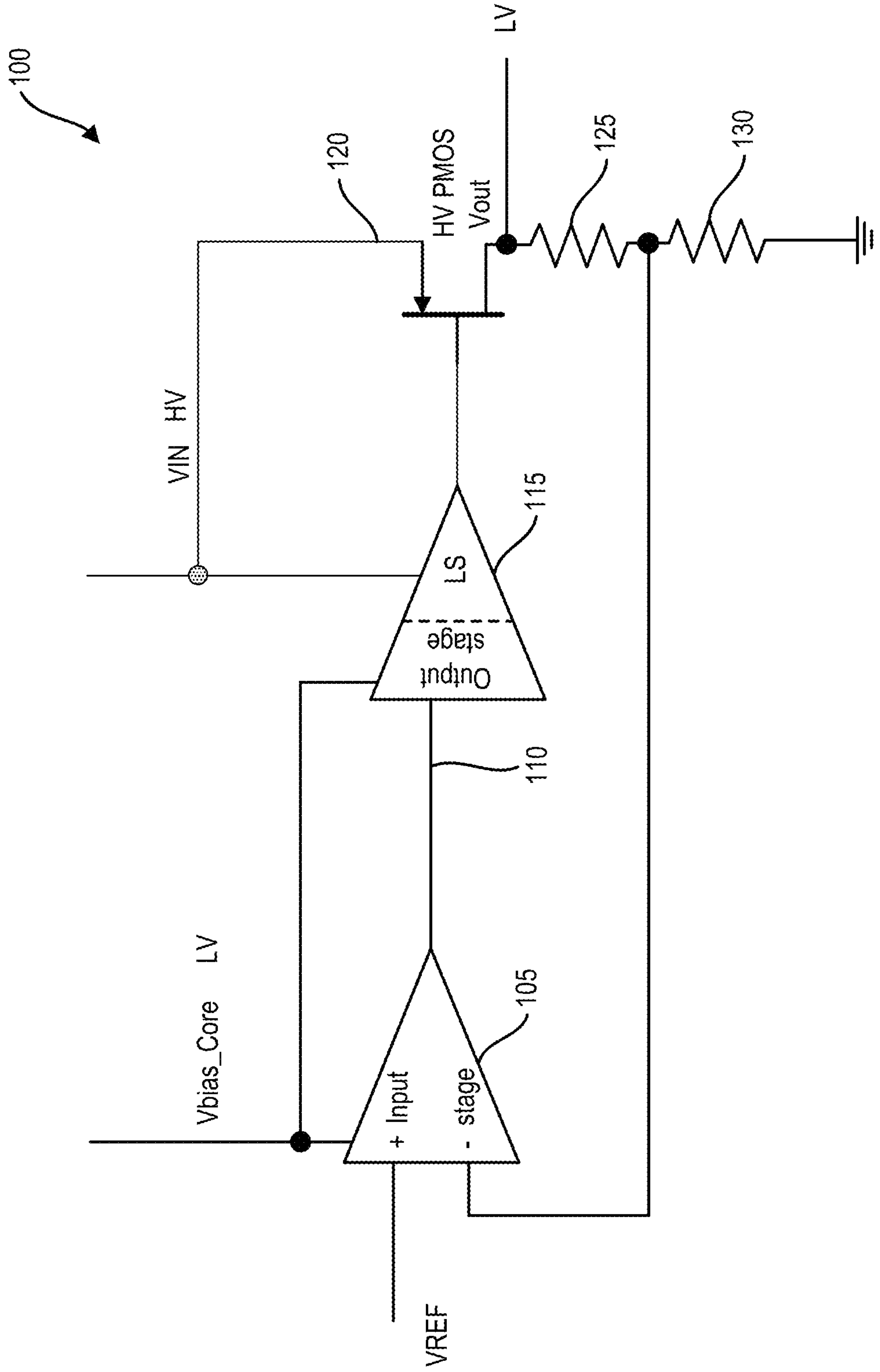
(PRIOR ART) FIG. 1
FIG. 1 shows a circuit diagram of an LDO regulator according to the prior art.

Reference will now be made in detail to the following various examples, which are illustrated in the accompanying drawings, wherein like reference numerals refer to like elements throughout. The following examples may be embodied in various forms without being limited to the examples set forth herein.

Figure 2:
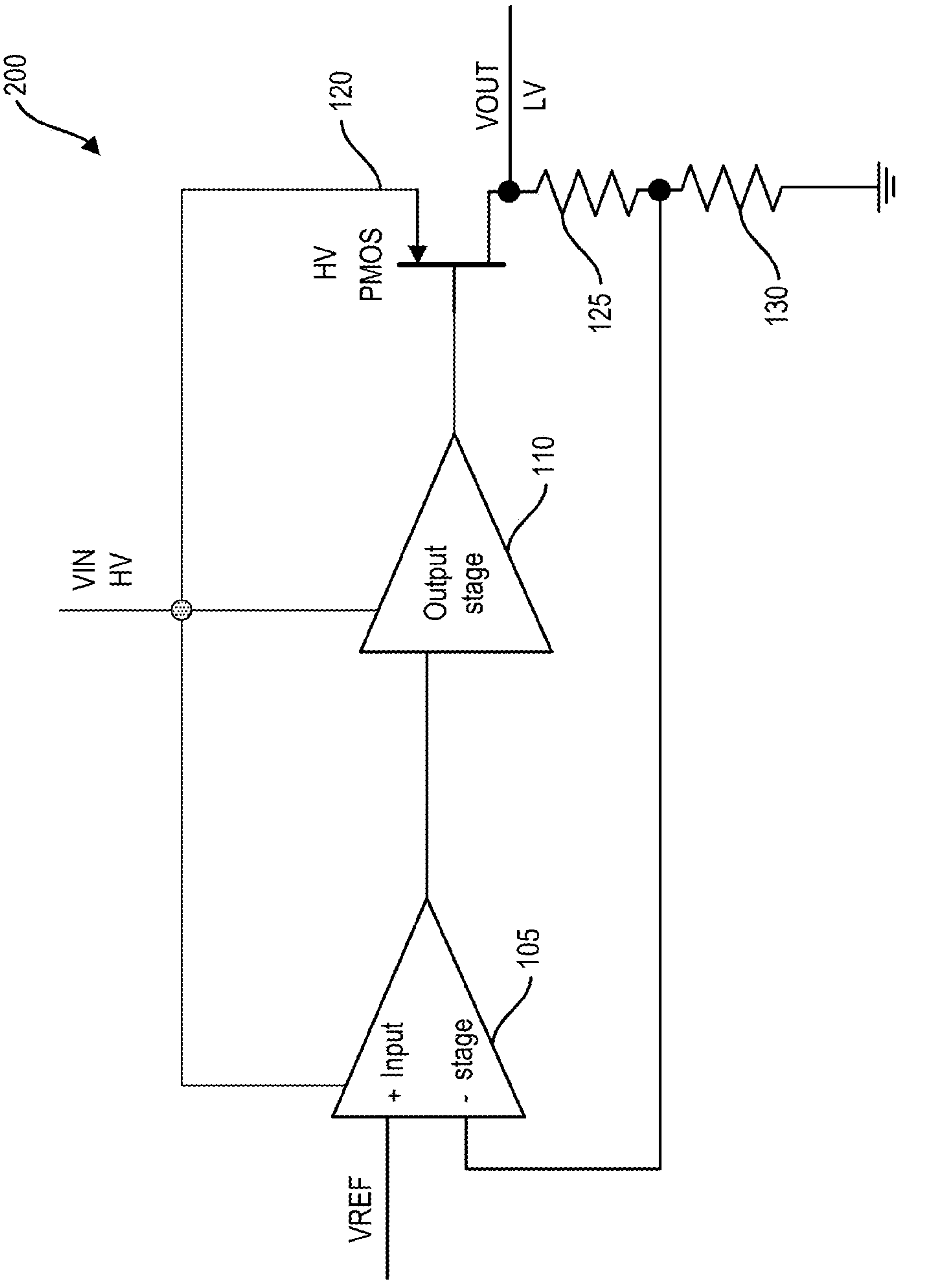
(PRIOR ART) FIG. 2
FIG. 2 shows a circuit diagram of another LDO regulator according to the prior art.
Figure 3:
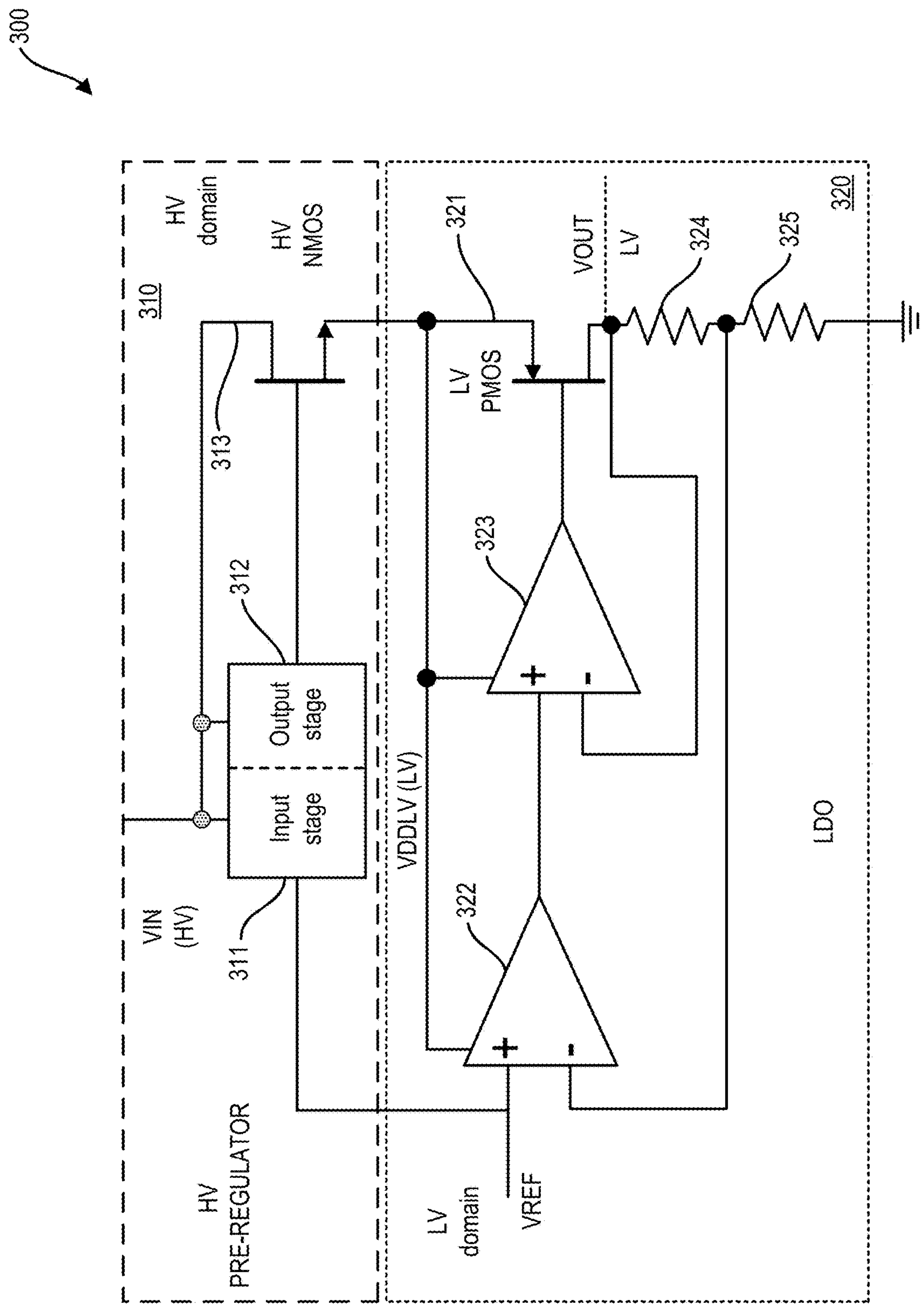
FIG. 3 shows a circuit diagram of an LDO regulator circuit according to various examples.

FIG. 3 shows an LDO regulator circuit 300 according to various examples. The LDO regulator circuit 300 of FIG. 3 may include a pre-regulator circuit 310 and a high speed (e.g., having a faster transient response than the prior art LDO regulators 100, 200 of FIGS. 1 and 2, used with or without an output capacitor) LDO regulator 320. The pre-regulator circuit 310 may include an input stage 311, an output stage 312, and a first MOSFET 313, respectively coupled to a high voltage rail VIN. VIN may be of approximately 5.5V to 25V. The input stage 311 of the pre-regulator circuit 310 may receive a reference voltage VREF, which may, for example, be provided by a band gap circuit (not shown) and may be approximately 1V. According to an example embodiment, the input stage 311 may receive at an inverting input (not shown) a representation of a low voltage supply voltage (VDDLV) directly or through a voltage divider. The input and output stages may be one stage (folded cascode) or two stages. Together the input stage and output stage are a high voltage op-amp used in a regulation loop to provide a low voltage supply. The first MOSFET 313 may be a high voltage NMOS FET having a gate terminal coupled to the output stage 312, a drain terminal coupled to the high voltage rail VIN, and a source terminal to provide the low voltage supply voltage VDDLV to the high speed LDO regulator 320. The first MOSFET 313 may be capable of sustaining a high voltage between its drain terminal and its source terminal in order to regulate the voltage provided by the high voltage rail VIN to provide the low voltage supply voltage VDDLV to the high speed LDO regulator 320.

The high speed LDO regulator 320 of the LDO regulator circuit 300 of FIG. 3 may include a second MOSFET 321, which may be a low voltage PMOS FET (as shown) or may be a low voltage NMOS FET. As used herein, a “low voltage” MOSFET is a MOSFET that can accommodate no more than approximately 5.5V between its drain and source terminals. The second MOSFET 321 may include a first terminal coupled to the first MOSFET 313 to receive the low voltage supply voltage. If second MOSFET 321 is a PMOS FET, the first terminal of the second MOSFET 321 is a source terminal coupled to the source terminal of the first MOSFET 313 to receive the low voltage supply voltage VDDLV, and the second terminal of the second MOSFET 321 is a drain terminal to output a low voltage output voltage VOUT, which may be approximately 3.3V. If the second MOSFET 321 is an NMOS FET, the first terminal of the second MOSFET 321 is a drain terminal coupled to the source terminal of the first MOSFET 313 to receive the low voltage supply voltage VDDLV, and the second terminal of the second MOSFET 321 is a source terminal to output the low voltage output voltage VOUT. The high speed LDO regulator 320 may also include a first amplifier 322 and a second amplifier 323 that respectively form a first loop and a second loop. The second MOSFET 321 may include a gate terminal that is coupled to an output of the second amplifier 323.

The first and second amplifiers 322, 323 may respectively receive the low voltage supply voltage VDDLV provided by the pre-regulator circuit 310, as a supply voltage. The first amplifier 322 may receive at a non-inverting terminal, a reference voltage, which may, for example, be provided a band gap circuit (not shown) and may be the approximately 1V reference voltage VBG provided to the input stage 311 of the pre-regulator circuit 310. The first amplifier 322 may receive at an inverting terminal a representation of the low voltage output voltage VOUT provided at the drain terminal of the second MOSFET 321. According to various examples, the high speed LDO regulator 320 may include a voltage divider having a first resistor 324 and a second resistor 325, which may provide a divided low voltage output voltage to the inverting terminal of the first amplifier 322, as shown in FIG. 3 as the representation of the low voltage output voltage VOUT. The feedback of a representation of the low voltage output voltage to the first amplifier 322 creates a first loop that may be slower, but more accurate in maintaining the low voltage output voltage, as compared to the second loop formed by the second amplifier 323, described in more detail below. More specifically, the first amplifier 322 may have a higher open loop gain than the second amplifier 323 in order to achieve accurate output voltage, while the second amplifier 323 responds faster than the first amplifier 322 to respond to load current transients. In the example embodiment shown in FIG. 3, the second loop (which includes the second amplifier 323) is included within the first loop (which includes the first amplifier 322), such that the open loop gain of the first loop is the product of the gain of the first amplifier 322 and the closed loop gain of the second loop.

The second amplifier 323 of the high speed LDO regulator 320 receives the output of the first amplifier 322 at a non-inverting input. The output of the second amplifier 323 is coupled to the gate terminal of the second MOSFET 321. The inverting terminal of the second amplifier 323 is coupled to the output of the high speed LDO 320, i.e. to receive at the inverting terminal the low voltage output voltage VOUT provided at the drain terminal of the second MOSFET 321. The feedback of the low voltage output voltage VOUT to the inverting terminal of the second amplifier 323 forms a second loop that may provide a faster response to load transients, as compared to the first loop. In particular, the second amplifier 323 may have a lower open loop gain, but faster transient response, than the first amplifier 322.

In the LDO regulator 300 circuit of FIG. 3, the first MOSFET 313 of the pre-regulator circuit 310 creates the low voltage supply voltage VDDLV for the high speed LDO regulator 320. The combination of the first MOSFET 313 and the second MOSFET 321 may provide a fast transient response regardless of the bandwidth or speed of the pre-regulator circuit 310. For example, if a load coupled to the output of the high speed LDO 320 to receive the low voltage output voltage VOUT suddenly demands higher/lower current then the low voltage output voltage VOUT will decrease/increase, which causes the second amplifier 323 of the faster second loop to adjust the gate voltage provided to the second MOSFET 321 in order to provide the increased/decreased load current. The voltage at the source terminal of the first MOSFET 313 is pulled down/up by the second MOSFET 321, which increases/decreases the gate-source voltage VGS of the first MOSFET 313, thereby increasing/decreasing the current supplied by the first MOSFET 313. As the voltage provided to the inverting input of the first amplifier 322 changes in response to the increased/decreased load current, the output of the first amplifier 322 likewise adjusts the voltage provided to the non-inverting input of the second amplifier 323, thereby controlling the gate voltage of the second MOSFET 321 to continue providing the increased/decreased load current. That is, while both the first and second loops respond to the increased/decreased load current, the second faster loop, along with the second MOSFET 321 and first MOSFET 313 are able to quickly provide the increased/decreased load current in response to a sudden change in the load, until the slower first loop and the remainder of the circuit are able to maintain the response and re-adjust the accuracy of low voltage output voltage VOUT after the load change.

Similarly, if the high voltage rail VIN suddenly increases or decreases, the LDO regulator circuit 300 will quickly respond to maintain the low voltage output voltage VOUT. More specifically, if the input voltage VIN increases/decreases the gate of 313 MOSFET will be pushed up/down through the drain-gate parasitic capacitance causing the current to the load to increase/decrease. The resulting increase/decrease in the current to the load is addressed by the LDO regulator circuit 300, as described above.

Figure 4:
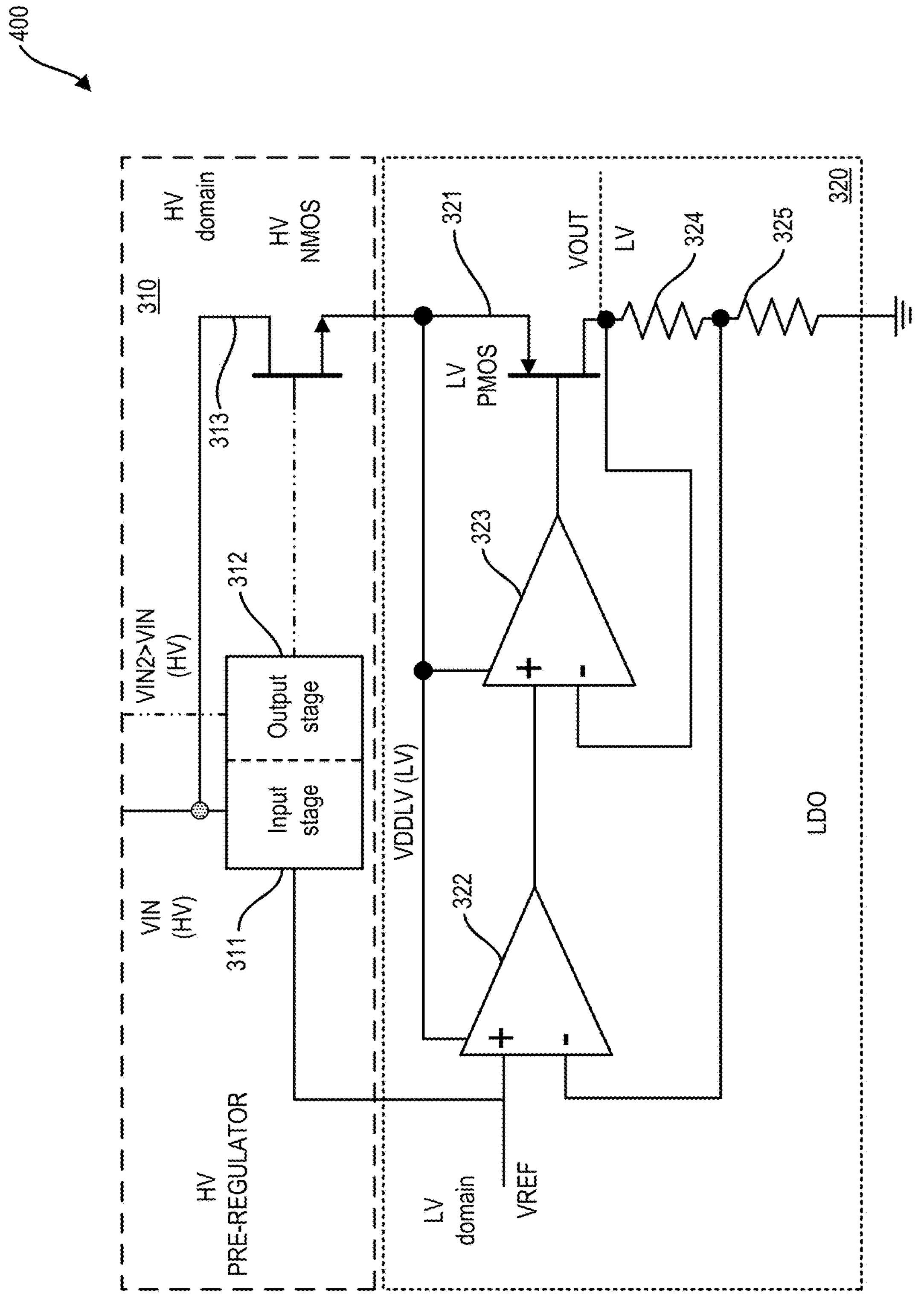
FIG. 4 shows a circuit diagram of another LDO regulator circuit according to various examples.

FIG. 4 shows an LDO regulator circuit 400 according to various examples. The LDO regulator circuit 400 of FIG. 4 is similar to FIG. 3, including that the input stage of the pre-regulator circuit 310 and the drain terminal of the first MOSFET 313 are coupled to a first high voltage source VIN of, for example, approximately 5.5V to 25V, except the output stage 312 of the pre-regulator circuit 310 is coupled to a second high voltage source VIN2 of, for example, approximately 6.5V to 100V, which second high voltage source VIN2 has a voltage greater than the voltage of first high voltage source VIN. By using separate high voltage input sources for the pre-regulator circuit 310, the voltage drop from the input voltage from the first high voltage source VIN to the low voltage output voltage VOUT may be reduced. For example, if the first MOSFET 313 does not have a low threshold voltage, using a separate high voltage rail such as second high voltage source VIN2 can result in a low dropout from the input voltage from the first high voltage source VIN to the low voltage supply and as a consequence the dropout from low voltage supply to the low voltage output voltage VOUT. More specifically, certain applications may require a particular minimum unregulated input voltage provided at the drain terminal of the first MOSFET 313. However, the difference between the voltages at the drain and source terminals of the first MOSFET 313 may be too low (i.e., the unregulated input voltage provided to the drain terminal is too close to the low voltage output voltage VOUT) to ensure proper operation of the first MOSFET 313. By providing a higher voltage at the gate terminal of the first MOSFET 313, using the second high voltage source VIN2, proper operation of the first MOSFET 313 may be achieved, despite the similar voltages at the drain and source terminals of the first MOSFET 313.

Figure 5:
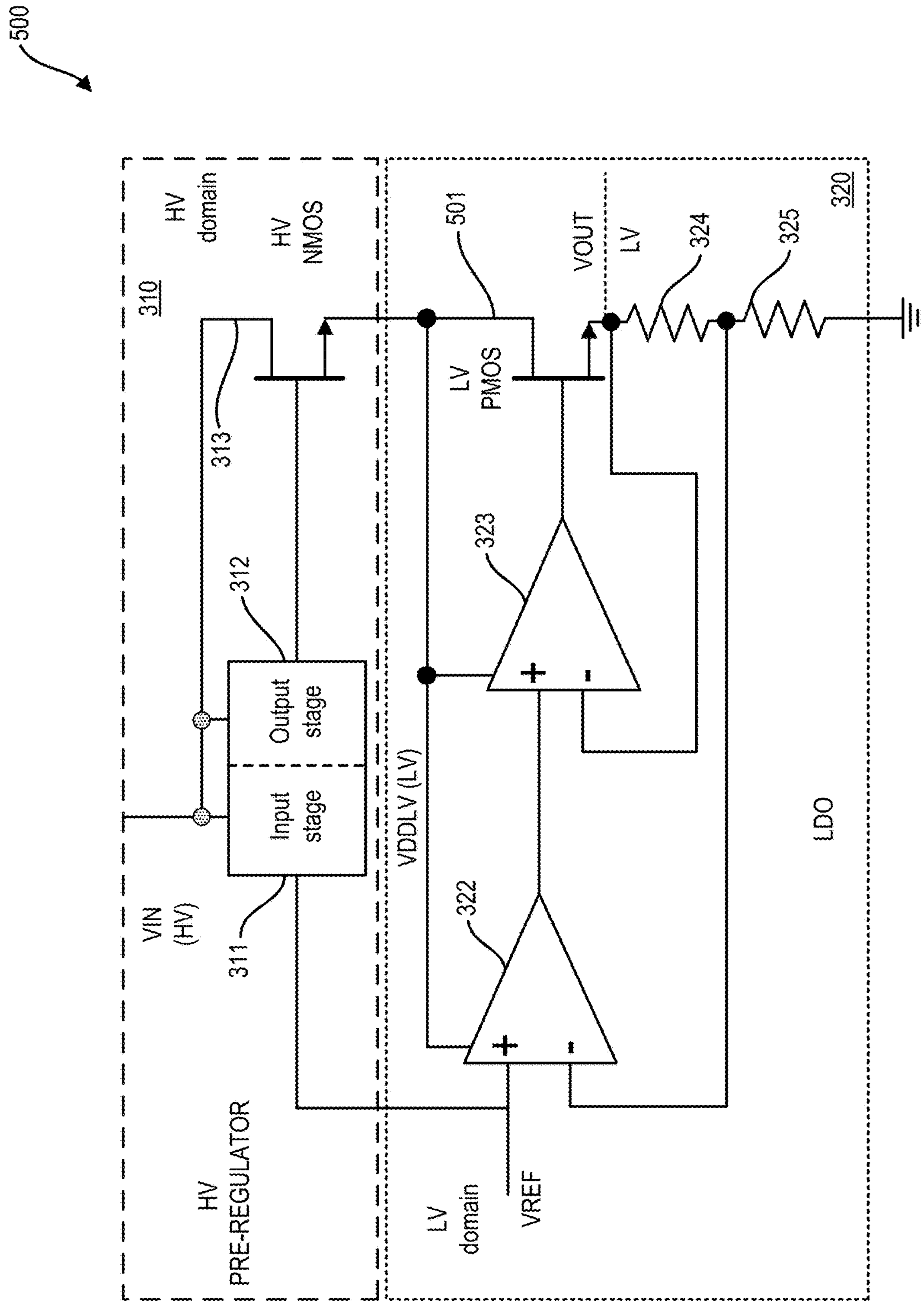
FIG. 5 shows a circuit diagram of another LDO regulator circuit according to various examples.

FIG. 5 shows a circuit diagram of another LDO regulator circuit 500 according to various examples. The LDO regulator circuit 500, as illustrated in FIG. 5, is structurally similar to the circuit 300 depicted in FIG. 3, with key distinctions. Specifically, the first MOSFET 313 and the second MOSFET 501 in FIG. 5 are n-type MOSFETs, unlike their counterparts in FIG. 3. The source terminal of the first MOSFET 313 is electrically connected to the drain terminal of the second MOSFET 501. The source terminal of the first MOSFET 313 is configured to provide the low voltage supply voltage (VDDLV), while the source terminal of the second MOSFET 501 delivers the low voltage output voltage (VOUT).

Figure 6:
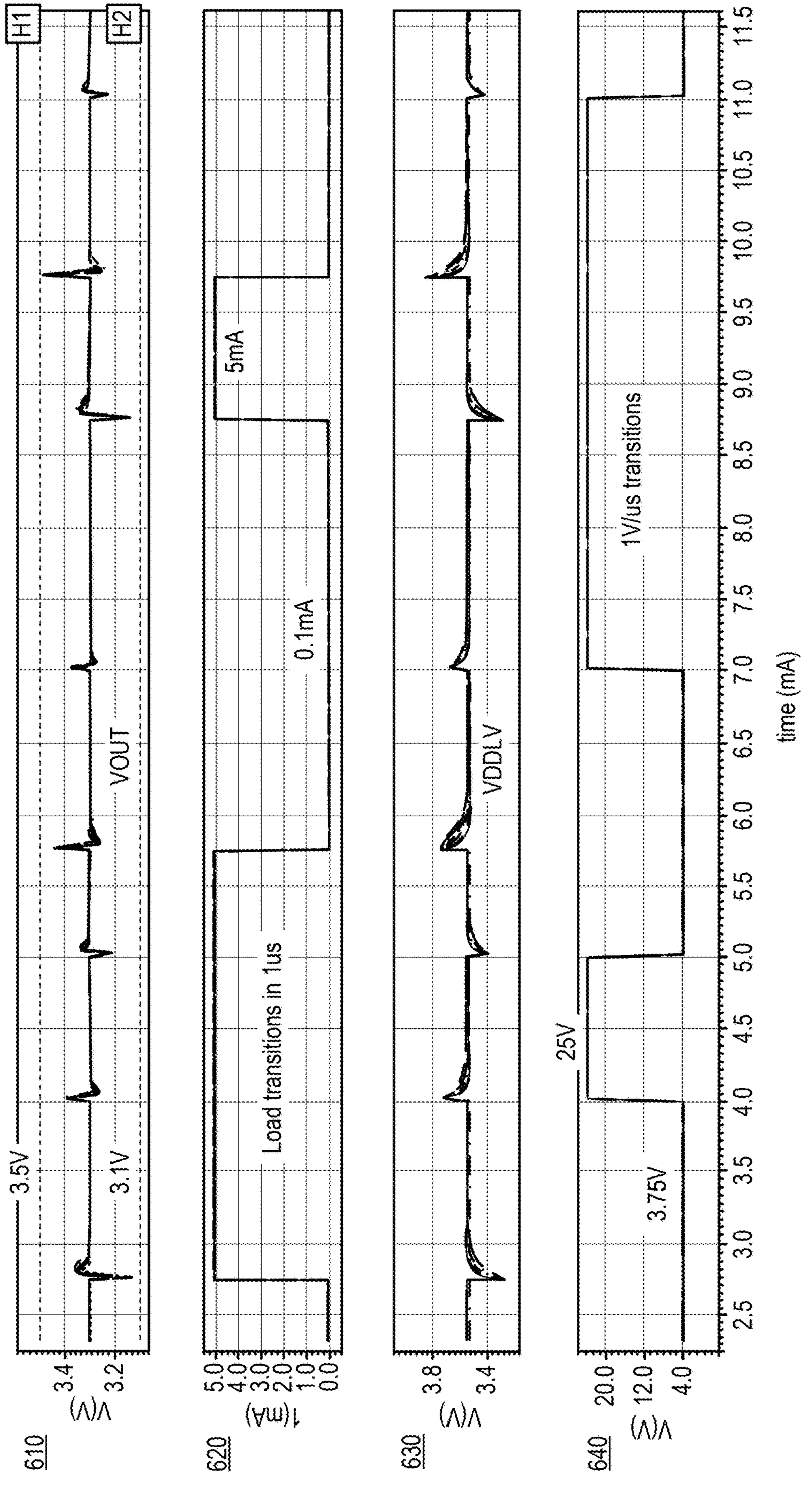
FIG. 6 shows a waveform diagram showing multiple waveforms of signals associated with the circuit diagram of FIG. 3, FIG. 4, and/or FIG. 5.

FIG. 6 shows multiple waveforms associated with the LDO regulator circuit 300 of FIG. 3. The top waveform 610 represents the low voltage output voltage VOUT at the drain terminal of the second MOSFET 321. The second waveform 620 represents the load current of a load (not shown) that receives the low voltage output voltage VOUT. The third waveform 630 represents the low voltage supply voltage VDDLV provided at the source terminal of the first MOSFET 313. The bottom waveform 640 represents the input voltage VIN provided to the pre-regulator circuit 310, which ranges from approximately 3.75V to 25V. As shown in the waveforms of FIG. 6, when a load transient occurs at approximately 2.6 ms, the low voltage output voltage VOUT shown in waveform 610 drops less than 200 mV, but then quickly returns to approximately 3.3V. Similarly, the low voltage supply voltage VDDLV shown in waveform 630 also drops from approximately 3.5V by less than 200 mV, and then quickly returns to approximately 3.5V. The same behavior is shown also when load transients occur at 5.5 ms, 8.75 ms and 9.75 ms.

FIG. 6 also shows that the LDO regulator circuit 300 may demonstrate a fast response to variations in the input voltage. At approximately 4 ms, the input voltage VIN shown in waveform 640 increases from approximately 3.75V to approximately 25V. In response, the low voltage output voltage VOUT shown in waveform 610 and the low voltage supply voltage VDDLV shown in waveform 630 vary by less than 200 mV before respectively returning to approximately 3.3V and 3.5V. The same behavior is shown also at input voltage transients that occur at 5 ms, 7 ms and 11 ms. Therefore, the LDO regulator circuit 300 may provide an improved transient response and power supply rejection ratio.

Figure 7:
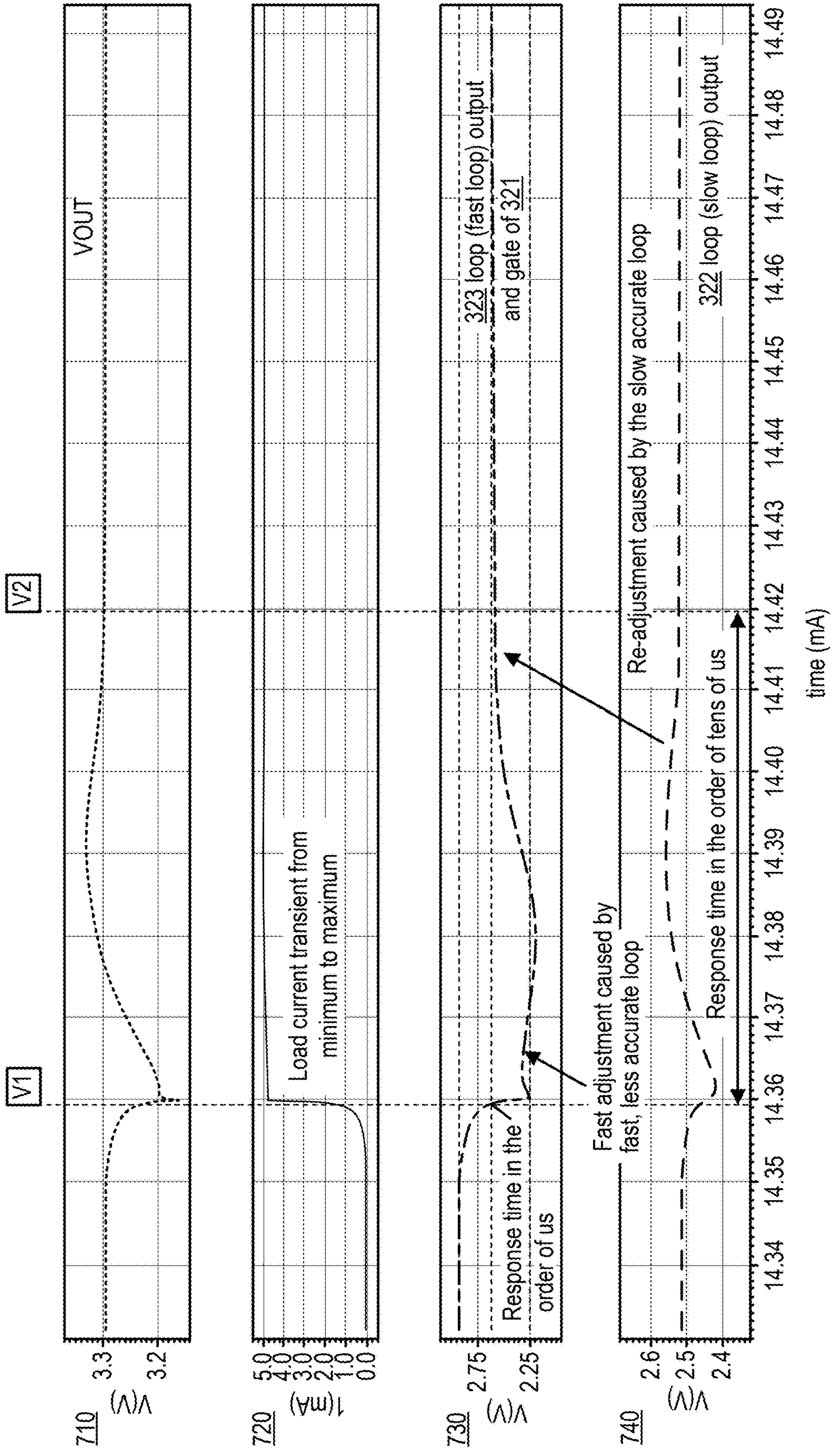
FIG. 7 shows a waveform diagram showing multiple waveforms of signals associated with the circuit diagram of FIG. 3, FIG. 4, and/or FIG. 5.

FIG. 7 shows multiple waveforms associated with the LDO regulator circuit 300 of FIG. 3. The top waveform 710 represents the low voltage output voltage VOUT at the drain terminal of the second MOSFET 321. The second waveform 720 represents the load current of a load (not shown) that receives the low voltage output voltage VOUT. The third waveform 730 represents the output of the second amplifier 323 that is provided to the gate terminal of the second MOSFET 321. The bottom waveform 740 represents the output of the first amplifier 322, which is provided to the non-inverting terminal of the second amplifier 323. As shown in the waveforms of FIG. 7, when a load transient occurs at approximately 14.36 ms, the low voltage output voltage VOUT rapidly decreases, as shown in waveform 710. The rapid decrease in the low voltage output voltage VOUT causes the output of the fast loop containing the second amplifier 323 to decrease quickly from approximately 2.5V to approximately 2.25V in just several microseconds, as shown in waveform 730, which increases the load current, as shown in waveform 720. The voltage at the source terminal of the first MOSFET 313 is pulled down by the second MOSFET 321, which increases the gate-source voltage VGS of the first MOSFET 313, thereby increasing the current supplied by the first MOSFET 313. As the voltage provided to the inverting input of the first amplifier 322 changes in response to the increased load current, the output of the first amplifier 322, shown in waveform 740 adjusts the voltage provided to the non-inverting input of the second amplifier 323, thereby controlling the gate voltage (waveform 730) of the second MOSFET 321 to continue providing the increased load current as well as adjusting the low voltage output voltage VOUT to be in the requested accuracy.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. An low dropout (LDO) regulator circuit comprising:

a pre-regulator circuit to receive a high voltage input voltage and provide a low voltage supply voltage; and an LDO regulator to receive the low voltage supply voltage and provide a low voltage output voltage;

wherein the pre-regulator circuit comprises an input stage, an output stage coupled to the input stage, and a first MOSFET coupled to the output stage to provide the low voltage supply voltage, wherein the input stage, output stage, and first MOSFET receive the high voltage input voltage;

wherein the LDO regulator comprises a second MOSFET to receive the low voltage supply voltage and provide the low voltage output voltage;

wherein the first MOSFET is a high voltage n-type MOSFET and the second MOSFET is a low voltage p-type MOSFET;

wherein a source terminal of the first MOSFET is coupled to a source terminal of the second MOSFET, the low voltage supply voltage is provided at terminal of the first MOSFET, and the low voltage output voltage is provided at a drain terminal of the second MOSFET;

wherein the LDO regulator comprises a first amplifier and a second amplifier, to respectively receive the low voltage supply voltage;

wherein the first amplifier comprises an inverting input to receive a representation of the low voltage output voltage and a non-inverting input to receive a reference voltage;

wherein the second amplifier comprises a non-inverting input to receive an output of the first amplifier, and an inverting input to receive the low voltage output voltage; and wherein the output of the second amplifier is coupled to gate terminal of the second MOSFET.

2. The LDO regulator circuit of claim 1, wherein the LDO regulator comprises a voltage divider to divide the low voltage output voltage; and wherein the inverting input of the first amplifier is to receive a divided low voltage output voltage from the voltage divider as the representation of the low voltage output voltage.

3. The LDO regulator circuit of claim 1, wherein the input stage of the pre-regulator circuit is to receive the reference voltage.

4. A low dropout (LDO) regulator circuit comprising:

a pre-regulator circuit to receive a first high voltage input voltage and a second high voltage input voltage, and provide a low voltage supply voltage, the second high voltage input voltage greater than the first high voltage input voltage; and an LDO regulator to receive the low voltage supply voltage and provide a low voltage output voltage;

wherein the pre-regulator circuit comprises an input stage, an output stage coupled to the input stage, and a first MOSFET coupled to the output stage to provide the low voltage supply voltage, wherein the input stage and a drain terminal of the first MOSFET receive the first high voltage input voltage, and the output stage receives the second high voltage input voltage; and wherein the LDO regulator comprises a second MOSFET coupled to the first MOSFET to provide the low voltage output voltage;

wherein the first MOSFET is a high voltage n-type MOSFET and the second MOSFET is a low voltage p-type MOSFET, wherein a source terminal of the first MOSFET is couple to a source terminal of the second MOSFET, the low voltage supply voltage is provided at the source terminal of the first MOSFET, and the low voltage output voltage is provided at a drain terminal of the second MOSFET wherein the LDO regulator comprises a first amplifier and a second amplifier, to respectively receive the low voltage supply voltage;

wherein the first amplifier comprises an inverting input to receive the low voltage output voltage and a non-inverting input to receive a reference voltage;

wherein the second amplifier comprises a non-inverting input to receive an output of the first amplifier, and an inverting input to receive the low voltage output voltage; and wherein the output of the second amplifier is coupled to gate terminal of the second MOSFET.

5. The LDO regulator circuit of claim 4, wherein the LDO regulator comprises a voltage divider to divide the low voltage output voltage; and wherein the inverting input of the first amplifier is to receive a divided low voltage output voltage from the voltage divider.

6. A method for regulating voltage in a low dropout (LDO) regulator circuit, the method comprising:

receiving a high voltage input voltage at a pre-regulator circuit;

generating a low voltage supply voltage using the pre-regulator circuit, wherein the pre-regulator circuit comprises:

an input stage;

an output stage coupled to the input stage; and a first MOSFET coupled to the output stage to provide the low voltage supply voltage, wherein the input stage, output stage, and first MOSFET receive the high voltage input voltage;

supplying the low voltage supply voltage to an LDO regulator;

generating a low voltage output voltage using the LDO regulator, wherein the LDO regulator comprises a second MOSFET to receive the low voltage supply voltage and provide the low voltage output voltage;

providing a divided low voltage output voltage to an inverting input of a first amplifier, said divided low voltage provided from a voltage divider coupled to the second terminal of the second MOSFET, and a reference voltage to a non-inverting input of the first amplifier;

providing an output of the first amplifier to a non-inverting input of a second amplifier, and the low voltage output voltage to an inverting input of the second amplifier; and controlling a gate voltage of the second MOSFET based on an output of the second amplifier.

7. The method of claim 6, wherein the first MOSFET is a high voltage n-type MOSFET and the second MOSFET is a low voltage p-type MOSFET.

8. The method of claim 6, wherein the first MOSFET is a high voltage n-type MOSFET and the second MOSFET is a low voltage n-type MOSFET.

9. The method of claim 6, further comprising:

in response to an increase in a load receiving the low voltage output voltage, controlling the gate voltage of the second MOSFET to generate an increased load current at the second terminal of the second MOSFET.

10. The method of claim 6, further comprising providing a second high voltage input voltage to circuit driving a gate terminal of the first MOSFET;

wherein the second high voltage input voltage is greater than the first high voltage input voltage.

* * * * *